UNITED STATES PATENT OFFICE.

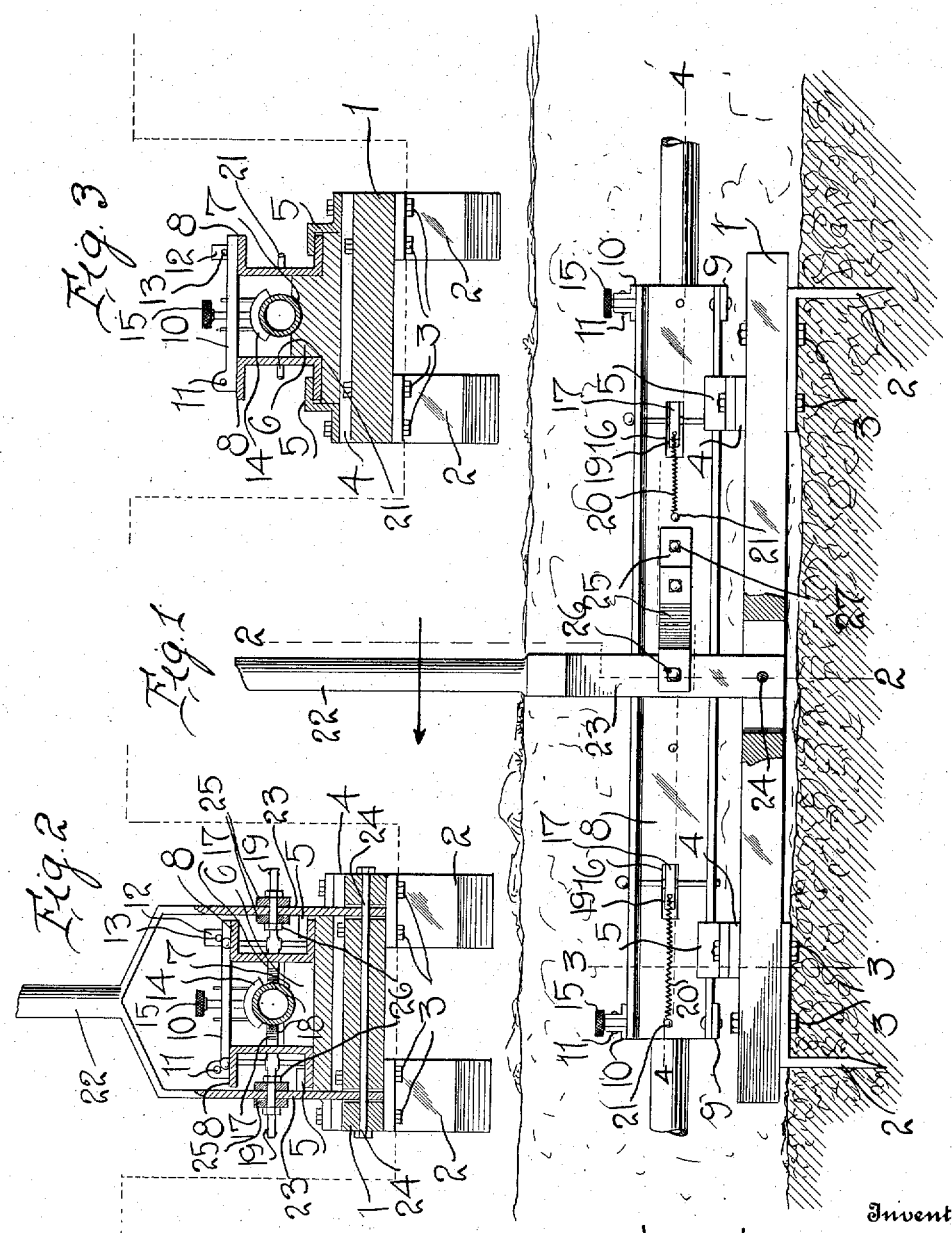

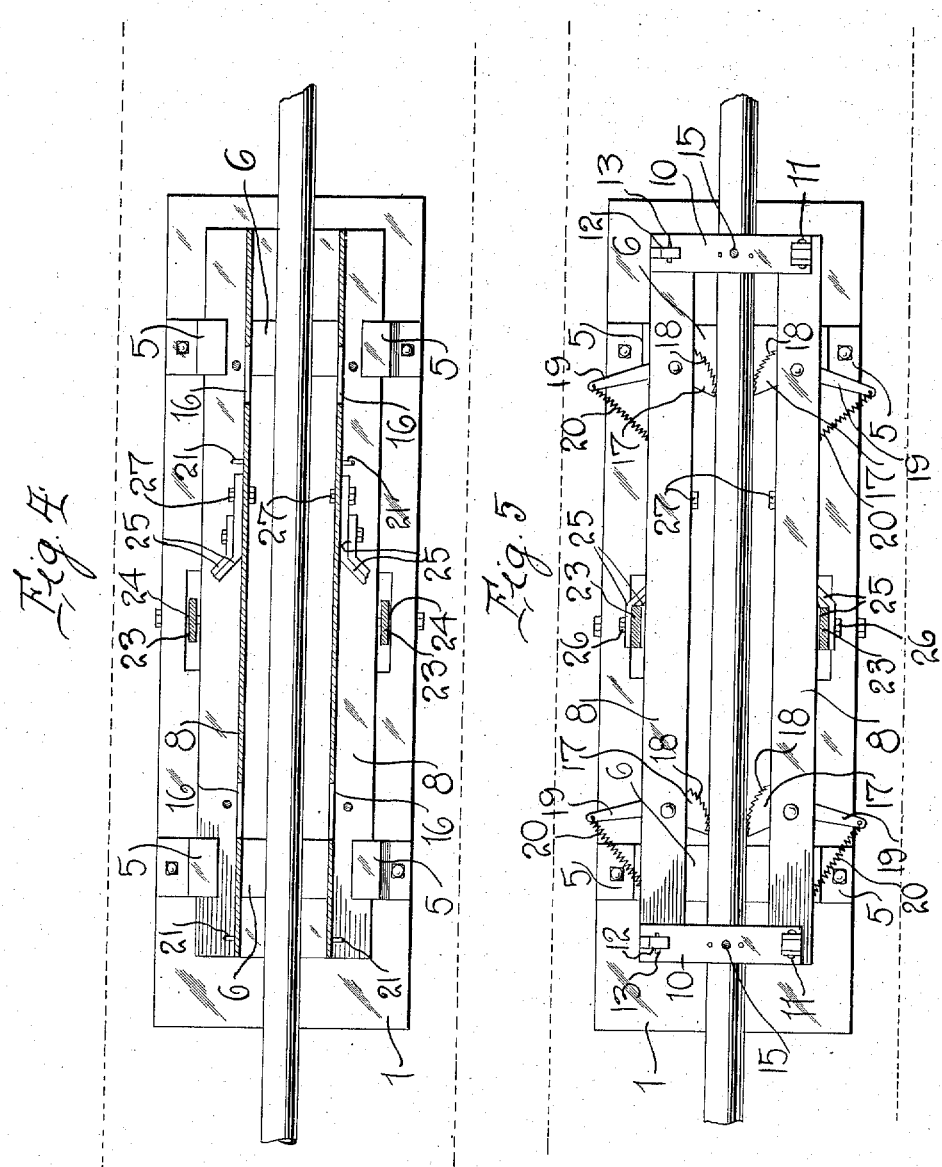

JACK JACKSON, OF BROKEN ARROW, OKLAHOMA.

PIPE-LAYING MACHINE.

1,167,565.  Specification of Letters Patent.  Patented Jan. 11, 1916.

Application filed January 30, 1915. Serial No. 5,258.

*To all whom it may concern:*

Be it known that I, JACK JACKSON, a citizen of the United States, residing at Broken Arrow, in the county of Tulsa and State of Oklahoma, have invented certain new and useful Improvements in Pipe-Laying Machines, of which the following is a specification, reference being had to the accompanying drawings.

This invention relates to new and useful improvements in pipe laying machines and more particularly to a machine adapted to force the pipe through the earth beneath the surface thereof, whereby to do away with the necessity of excavating, the main object of the present invention being the provision of a machine of the above character whereby pipe can be readily laid beneath the surface of the street without excavating or breaking up the pavement except to form a small excavation at one side of the street which will be substantially the length of a pipe joint.

Another object of the present invention is the provision of a pipe laying machine of the above character which will possess advantages in points of efficiency and durability, is inexpensive to manufacture, and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of a pipe laying machine embodying the improvements of my invention. Fig. 2 is a transverse sectional view on the line 2—2 of Fig. 1. Fig. 3 is a similar view on the line 3—3 of Fig. 1. Fig. 4 is a horizontal sectional view, the section being taken approximately on the line 4—4 of Fig. 1; and Fig. 5 is a top plan view of the machine.

Referring more particularly to the drawings, 1 indicates the base member of my improved machine which, as herein shown and described, is formed of wood and is to be securely held in position by means of the anchor plates 2 which are preferably angular in form and having their lower ends tapered and adapted to be driven into the ground, whereby to securely hold the base member 1 against any lateral or longitudinal movement. The horizontal portions of the plates 2 are bolted to the base member 1 by means of the bolts 3. Extending transversely across the base member 1 and arranged in spaced relation are the supporting plates 4 and mounted upon these supporting plates are the angular guide plates 5, the purpose of which will be hereinafter more fully set forth.

Mounted upon the plates 4 and disposed between the oppositely disposed angular members 5, are the bearing blocks 6, the upper faces of which are provided with transversely arcuate grooves 7, adapted to receive a pipe therein. Mounted upon the extended ends of the bearing blocks and arranged in spaced opposed relation, are the channel members 8, the lower horizontal portions of which are engaged beneath the angular plates 5 and are mounted upon the extended ends of the bearing blocks for longitudinal movement.

The channel members 8 are connected at their ends by means of the transverse plates 9 and 10, the plates 9 being extended transversely across the ends of the channel members and riveted or otherwise secured to the bottom flanges. The plates 10 are pivotally connected each at one end, as shown at 11 to one of the channel members, while the other end of each of the plates is provided with an opening adapted to receive an upwardly projecting perforated lug 12, whereby these plates 10 may be readily arranged across the space between the channel members or removed. The end of each plate 10 is provided with an opening to receive the lug 12 and is held in position by means of a removable pin 13 which extends transversely through said lug. The pipe which is being held, is disposed between the channel members 8 and mounted on the arcuate faces of the blocks 6 and is securely held in position by means of an arcuate plate 14 attached to the lower end of the set screw 15 which is threaded within the central portion of each of the bars 10. From this it will be apparent that the pipe section, after being mounted upon the bearing blocks will be rigidly retained in position by the adjustment of the set screws 15, so that the plates 14 will be brought to bear upon the upper surface of the pipe.

The middle of the channel members 8 are provided with elongated slots 16 and eccentrically mounted within these slots are the cams 17, the inner faces of which are toothed, as shown at 18, while formed integral with the outer ends thereof, are the arms 19 and connected to the outer ends of the arms 19 are the coil springs 20, the opposite ends of said coil springs being connected with the screw bolts 21 which are carried by the channel members 8. As illustrated in Fig. 5 a pipe section is arranged in position between the cam members, so that upon longitudinal movement of the channel sections 8, the pipe section will be forced longitudinally within the machine and as the frame is moved backward, the cams will readily pass over the outer surface of the pipe and upon further forward movement will again grip the outer face of the pipe and move the same forward upon a second operation of the frame.

In order to reciprocate the frame which includes the channel members 8, I provide an operating lever 22, the lower end of which is forked to provide the spaced arms 23, said arms having their ends pivotally mounted upon the base 1, as shown at 24, while the extreme portions of the arms 23 are connected with the channel members 8, by means of the links 25, said links being arranged in pairs upon opposite sides of the channel members and one of the ends of each set of links is disposed upon opposite sides of the lower ends of the arms 23 and pivotally connected thereto by means of the bolts 26, while the other ends of each set of links are bolted to the intermediate portions of the channel members 8, as shown at 27. Thus, as the lever 22 is moved in the direction of the arrow in Fig. 1 the eccentrically mounted cams 17 will grip the outer surfaces of the pipe and move the same longitudinally with respect to the base 1 and upon backward movement of the lever 22, the cams will readily pass over the outer surface of the pipe, so that the channel members 8 can be quickly and readily returned to their effective position.

From the above it will be apparent that in laying pipe on a paved street, an excavation is first made so that the frame of the machine can be readily anchored therein, it being understood that the machine will be disposed below the surface of the earth at a sufficient distance according to the depth the pipe is to be laid. This excavation should be of sufficient size so that a section of pipe can be readily lowered therein and placed within the machine. In placing a pipe in position within the frame, the plates 10 are removed from over the space between the channel members and the section of pipe lowered upon the arcuate faces of the bearing blocks 6. The plates 10 are then swung to an effective position and then secured by means of the pins 13 in the perforated lugs 12. The set screws 15 are then adjusted so that the arcuate plates 14 will be brought to bear upon the upper surface of the pipe section. After the pipe has been securely fastened in position, the channel members 8 are reciprocated by means of the lever 22 and as the cams 17 will grip the outer surface of the pipe, the pipe will be moved longitudinally with respect to the base 1 and be forced through the upper surface of the earth beneath the pavement.

From the above description, it will be readily apparent that my improved machine is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features, or departing from the scope of the invention, as defined by the appended claims.

Having thus described this invention, what I desire to claim as new and secure by Letters Patent, is:—

1. A device of the class described including a base, anchor plates secured thereto and adapted to be secured to the surface of the earth to hold said plates in position, channel members arranged in spaced opposed relation and adapted for sliding movement upon the base, bearing blocks disposed between the channel members, means for retaining a pipe in position on said bearing blocks, spring actuated cams carried by the channel members and adapted for engagement with the sides of the plates, and means for moving said channel members in one direction whereby said cams will grip the pipe to move the same with the channel members, said cams passing over the pipe upon the return movement of the channel members, as and for the purpose set forth.

2. A device of the class described including a base member, supporting plates carried thereby, channel members arranged in spaced opposed relation and mounted upon said plates, angular members adapted to engage over the lower horizontal portions of the channels, to retain them in position, bearing blocks arranged between said channel members, pivoted cross bars adapted to connect the upper horizontal portions of the channels, a set screw carried by each of said bars, an arcuate plate at the lower end of each set screw adapted for engagement with the pipe placed upon the bearing blocks, spring actuated cam members carried by the channels and adapted for engagement with the pipe section disposed between said channels, and means for moving said channels whereby the cams will engage the pipe section upon movement in one direction and pass over the pipe section upon movement in the opposite direction.

3. A pipe laying machine including a base, a pair of longitudinally spaced bearing blocks mounted upon the base to freely receive a length of pipe, vertically adjustable blocks engageable with the upper face of the pipe for holding the same against upward displacement from the bearing blocks, a pair of longitudinally extending, parallel channel members movable upon the base, pivotally mounted cams carried by the channel members for gripping the pipe when the channel members are moved in one direction, and means for reciprocating the channel members.

4. A pipe laying machine including a base, longitudinally spaced, transversely extending plates mounted upon the base, parallel, longitudinally extending channel members mounted for sliding movement over the plates, guide members carried by the plates for holding the channel members against displacement, pivotal cam members carried by the channel members, bearing blocks supported upon the base, said blocks being adapted to receive a length of pipe, vertically adjustable members for holding a pipe against upward movement from the bearing blocks, and means for reciprocating the channel members.

In testimony whereof I hereunto affix my signature in the presence of two witnesses.

JACK JACKSON.

Witnesses:
R. TATUM,
JAS. J. DOWLING.

Copies of this patent may be obtained for five cents each, by addressing the "Commissioner of Patents, Washington, D. C."